(12) United States Patent
McKenna (10) Patent No.: US 9,416,808 B2
(45) Date of Patent: Aug. 16, 2016

(54) MOUNTING APPARATUS

(71) Applicant: Christopher Rex McKenna, Phoenix, AZ (US)

(72) Inventor: Christopher Rex McKenna, Phoenix, AZ (US)

(*) Notice: Subject to any disclaimer, the term of this patent is extended or adjusted under 35 U.S.C. 154(b) by 0 days.

(21) Appl. No.: 14/712,778

(22) Filed: May 14, 2015

(65) Prior Publication Data

US 2015/0330431 A1 Nov. 19, 2015

Related U.S. Application Data

(60) Provisional application No. 61/993,923, filed on May 15, 2014.

(51) Int. Cl.
| | |
|---|---|
| *F16B 13/00* | (2006.01) |
| *F16B 13/08* | (2006.01) |
| *F16B 39/02* | (2006.01) |
| *F16B 13/14* | (2006.01) |

(52) U.S. Cl.
CPC ............ *F16B 13/08* (2013.01); *F16B 13/0808* (2013.01); *F16B 13/0891* (2013.01); *F16B 13/143* (2013.01); *F16B 39/02* (2013.01); *F16B 39/021* (2013.01)

(58) Field of Classification Search
CPC .... F16B 11/006; F16B 13/141; F16B 33/004; F16B 13/08
USPC .............................. 411/82, 82.1, 19, 340, 344
See application file for complete search history.

(56) References Cited

U.S. PATENT DOCUMENTS

| | | | | |
|---|---|---|---|---|
| 701,691 | A * | 6/1902 | Engelhardt ............ | B65D 45/02 114/227 |
| 1,360,200 | A * | 11/1920 | Dowd ................. | F16B 13/0808 248/343 |
| 1,701,690 | A * | 2/1929 | Mueller .................... | A47K 5/02 248/225.21 |
| 4,321,745 | A | 3/1982 | Ford | |
| 4,659,269 | A * | 4/1987 | Stromiedel ........... | F16B 13/061 411/34 |
| 4,693,652 | A * | 9/1987 | Sweeney ................. | F16B 19/00 405/259.6 |
| 4,997,327 | A * | 3/1991 | Cira ..................... | F16B 13/0808 411/340 |
| 5,209,621 | A * | 5/1993 | Burbidge ............. | F16B 13/0808 411/340 |
| 6,035,595 | A * | 3/2000 | Anderson ............. | E04F 13/045 411/258 |
| 6,913,430 | B2 * | 7/2005 | Ito ........................ | F16B 13/0808 411/340 |
| 7,596,917 | B2 * | 10/2009 | Schloemer .............. | E04B 1/762 52/258 |
| 7,745,722 | B2 | 6/2010 | Warfield et al. | |
| 8,136,311 | B2 | 3/2012 | Liu | |
| 2012/0005983 | A1 | 1/2012 | Stephan | |
| 2013/0240466 | A1 | 9/2013 | Sponseller | |

OTHER PUBLICATIONS

"Composition Mount Specifications", Quick Mount PV, Aug. 2011.
(Continued)

*Primary Examiner* — Flemming Saether
(74) *Attorney, Agent, or Firm* — Fish & Tsang LLP (57) ABSTRACT

A mounting apparatus with self-sealing properties that is used for installing solar modules and other types of equipment and material by attaching it through roofing or other exterior or interior surfaces is disclosed. The mounting apparatus uses a bolt with a toggle to mount a body to the structural sheathing rather than bolting to a structural framing member. A nut is tightened on the bolt to secure the toggle on one side of the roofing or other exterior or interior surfaces while a plunger is simultaneously driven to dispose a sealant. Using the mounting apparatus eliminates the need for finding the centerline of a structural framing member and assures the quality and the integrity of the seal around the mounting apparatus.

20 Claims, 6 Drawing Sheets

(56) References Cited

OTHER PUBLICATIONS

"Asphalt Shingle Standoff Assembly", Schletter (no date provided).

"QBase Universal Tile Mount—QMUTM", Quick Mount PV, Oct. 2013.

"Standoffs & Flashings, Installation Manual 907.2", Unirac Installation Maunal, Jun. 2009.

* cited by examiner

MOUNTING APPARATUS

This application is claims the benefit of priority to U.S. Provisional Application Ser. No. 61/993,923, filed May 15, 2014. All extrinsic materials identified herein are incorporated by reference in their entirety.

FIELD OF THE INVENTION

The field of the invention is a self-sealing mounting apparatus for mounting equipment onto roofing or other exterior or interior surfaces.

BACKGROUND

The background description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Mounting systems can be used in various circumstances to support equipment onto walls, roofs, and other surfaces. Many of these systems use mounting attachments that fasten onto the wall, roof or other surface in order to adequately support the weight of the equipment. While weight distribution is beneficial for the surface supporting the mounted equipment, the location of the mounting attachments can create other structural or regulatory problems.

For example, conventional roof mounting systems use mounting points of attachment called standoffs which are fastened with lag bolts through the structural framing members (e.g., truss, rafter, etc.) of the roof. To be installed properly, conventional roof mounted points of attachment require finding the centerline of the structural framing member through the roof sheathing with specialty tools or by trial and error drilling and patching. Consequently, this methodology weakens the structural integrity of the roof framing and can damage the roof rafters or roof trusses.

When used on tile roofing, conventional roof mounted points of attachment require that certain roof tiles be removed and cut or notched and then re-installed around the standoff. Alternatively, metal flashing may be used to replace the tile, but this is expensive and still requires removing the roof tile and locating the framing member through the roof sheathing.

Installation of conventional roof mounted points of attachment can be labor intensive. In addition, conventional roof mounted points of attachment can create regulatory concerns. For example, some jurisdictions require a special attic inspection because building inspectors are concerned about potential truss or rafter damage occurring when lag bolts are misaligned with the centerline of the framing member. In another example of a regulatory concern, some jurisdictions require that points of attachment be made by anchoring the lag bolts through new solid blocking instead of into the truss or rafter.

Furthermore, conventional roof mounted points of attachment follows the building structural framing member for layout purposes. This usually requires that the spacing between points of attachments be rounded down to the next available structural member (e.g., truss or rafter). Consequently, the number of standoffs needed for proper mounting often exceeds the number required.

Various approaches have been developed in the field of mounting and attachment equipment, such as U.S. Pat. Pub. No. 2012/0005983 to Stephan, U.S. Pat. No. 4,321,745 to Ford, U.S. Pat. Pub. No. 2013/0240466 to Sponseller, and U.S. Pat. No. 8,136,311 to Liu. While these references provide some benefit in overcoming a problem, there are numerous deficiencies that they fail to overcome.

Thus, there is still a need for a mounting apparatus that is easy to install for mounting equipment onto roofing or other exterior or interior surfaces.

SUMMARY OF THE INVENTION

The inventive subject matter provides apparatus, systems and methods in which a mounting device can be attached onto roofing or other exterior or interior surfaces. The mounting device has a body with a base that defines an opening and a first aperture. At least partially disposed within the body is a plunger that has a through hole aligned with the opening. A bolt having a first end and a toggle on a second end extends through the opening. The mounting device improves upon conventional mounting systems by using a toggle based fastener to allow the body to be mounted onto structural sheathing rather than the structural framing member (e.g., truss, rafter) as used by conventional attachments using lag bolts. Thus, conventional steps of finding the centerline of the structural framing member, removing multiple roof tiles to find the structural framing member, and any potential misalignment of the anchoring fastener are eliminated.

The body also comprises a sealant located between the plunger and the opening. By having the sealant located between the plunger and the opening, movement of the plunger disposes the sealant through at least one of the first aperture and the opening to produce self-sealing properties. Thus, the quality and the integrity of the seal surrounding the mounting device are consistent among various mounting devices.

To prevent accidental movement of the plunger, the mounting device can further include a set pin. The set pin engages a set hole that extends through the body and the plunger to prevent the plunger from moving within the body to dispose the sealant. The set pin is removed when installation is desired to allow the plunger to dispose the sealant.

The mounting device can have various suitable sealants and sealant housings for producing self-sealing properties. For example, the sealant can comprise sealant beads. It should be appreciated that housing the sealant in beads prevents the sealant from prematurely drying within the body of the mounting device. When the plunger moves to dispose the sealant, the beads are crushed and mixed to produce the seal. To improve mixing and crushing, the plunger can further include teeth.

In another example of a sealant housing, the sealant can be housed in a doughnut shaped breakable sealant bag. As used herein, doughnut shaped is defined as a ring-shaped object, such as a torus. Similar to the sealant beads discussed above, housing the sealant in a doughnut shaped breakable sealant bag prevents the sealant from prematurely drying within the body of the mounting device. When the plunger moves to dispose the sealant, the doughnut shaped breakable sealant bag is ruptured to expose the sealant.

While a housing can be used to prevent premature drying as discussed above, an airtight sticker and a plastic disk can be used within the body to prevent drying. The airtight sticker covers the first aperture and the plastic disk is disposed within the body between the plunger and the sealant. As used herein, airtight is defined as substantially impermeable to air by preventing at least 90% penetration of air, more preferably 95% penetration of air, and most preferably 99% penetration of air.

In another aspect of the inventive subject matter, the inventors have discovered a self-sealing mounting apparatus for a surface. The mounting apparatus comprises a body having a base that defines an opening and a first aperture. A plunger having a through hole aligns with the opening of the body. A bolt extends through the opening having a first end and a toggle on a second end. At the first end of the threaded bolt is a nut that is used to provide movement to the plunger. A sealant is disposed within the body between the plunger and the opening, such that a driving force created by the nut and the toggle moves the plunger to dispose the sealant through at least one of the first aperture and the opening to form a seal on the surface.

In this aspect, various suitable sealant configurations (e.g., airtight sticker and plastic disk, beads, doughnut shaped breakable bag) can be used to prevent premature drying of the sealant within the body. In addition, a set pin can be used that engages a set hole extending through the body and the plunger to prevent accidental movement of the plunger.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
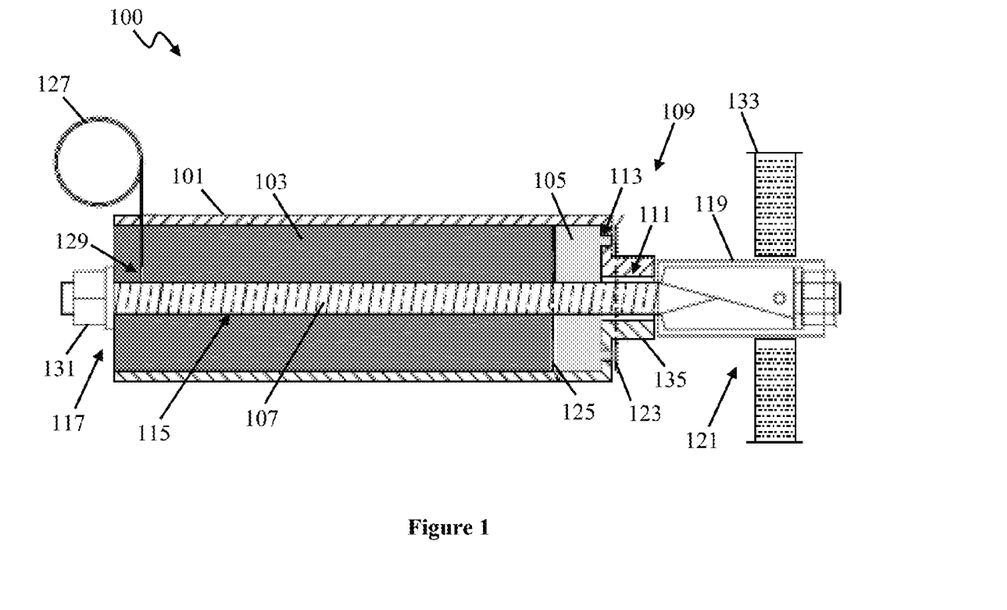
FIG. 1 is a cross sectional view of an example of a mounting apparatus before installation onto a surface.

A mounting apparatus has been discovered that can attach to roofing and other surfaces without using structural members (e.g., rafter, truss, beam). FIG. 1 shows an embodiment of a mounting apparatus 100 having a body 101, a plunger 103, a sealant 105, and a bolt 107 that cooperate to provide a self-sealing mount. Body 101 has a base 109 that defines an opening 111 and a first aperture 113. Plunger 103 is disposed within body 101 and has a through hole 115 that aligns with opening 111. Bolt 107 extends through opening 111 and has a first end 117 and a toggle 119 on a second end 121. Sealant 105 is located within body 101 between plunger 103 and opening 111. In this location, plunger 103 can dispose sealant 105 through at least one of first aperture 113 and opening 111 whereby the disposed sealant 105 forms a seal.

FIG. 1 shows mounting apparatus 100 in a pre-installation configuration. During pre-installation, sealant 105 remains in body 101. Sealant 105 can be protected from prematurely drying within body 101. For example, as shown in FIG. 1, an airtight sticker 123 can be used to cover first aperture 113 to prevent sealant 105 from drying. In addition, a plastic disk 125 can be disposed within body 101 between plunger 103 and sealant 105 to prevent the sealant from drying onto plunger 103.

In order to prevent accidental movement of plunger 103, a set pin 127 engages a set hole 129 that extends through body 101 and plunger 103. Since set pin 127 extends through body 101 and plunger 103, plunger 103 is prevented from moving within body 101 to dispose sealant 105. Thus, set pin 127 is removed prior to disposing sealant 105 in the process.

As shown in FIG. 1 mounting apparatus includes a nut 131 that is sized and dimensioned to engage first end 117 of bolt 107. Nut 131 moves down bolt 107 as it is tightened and drives plunger 103 towards base 109 of body 101 to dispose sealant 105.

To better understand how the different components described above interact, an example of using mounting apparatus 100 on roof sheathing 133 is provided. FIG. 1 shows mounting apparatus 100 in a pre-installation configuration having set pin 127 in place and sealant 105 within body 101. A portion of mounting apparatus 100 is guided through a hole in roof sheathing 133, such that toggle 119 is slid through the hole in roof sheathing 133. The hole in roof sheathing 133 can be created by using a drill through a roof tile, if any, and the roof deck and creating two concentric holes through roof tile/foam and the sheathing below. The tile/foam hole is typically larger, but both holes are preferably on the same centerline.

Figure 2:
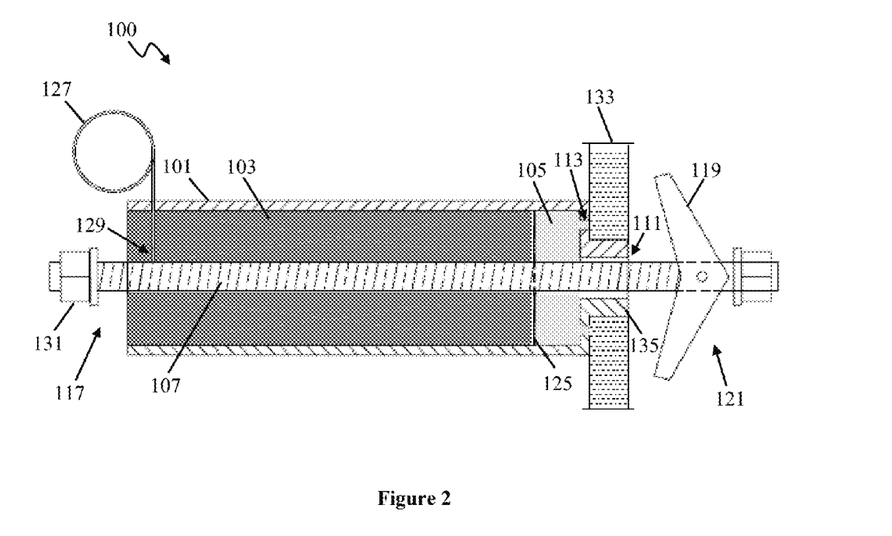
FIG. 2 is a cross section view of the mounting apparatus of FIG. 1 during installation.

FIG. 2 shows mounting apparatus 100 in a set configuration. Toggle 119 is slid through the hole in roof sheathing 133 to the underside of roof sheathing 133. Once on the other side, toggle 119 has wings that expand, which are used to spread weight applied to mounting apparatus 100 over a larger area. Body 101 also has a ridge 135 that extends from base 109. Ridge 135 engages the hole in roof sheathing 133 as shown in FIG. 2, which stabilizes body 101 against lateral forces. A user can pull on bolt 107 back so that toggle 119 rests on the back side of roof sheathing 133. In this fashion, toggle 119 is held on the back side of roof sheathing 133 until the appropriate tension is provided by the tightening of nut 131.

Figure 3:
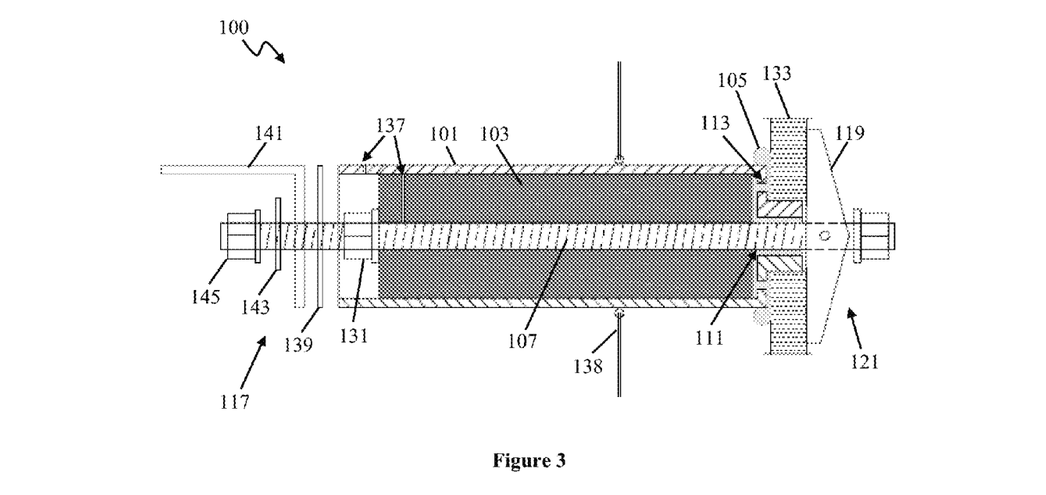
FIG. 3 is a cross sectional view of the mounting apparatus of FIG. 1 after installation.

FIG. 3 shows mounting apparatus 100 in a post-installation configuration. Once in the set configuration, set pin 127 is removed from the set hole 137 to allow movement of plunger 103. Nut 131 is tightened, which provides tension to toggle 119 on the underside of roof sheathing 133 while simultaneously driving plunger 103 to displacing sealant 105. It should be appreciated that nut 131 can be tightened using a power drill or a manual tool. The disposed sealant 105 acts as a liquid flashing inner jack by sealing body 101 on the exterior side of roof sheathing 133. A flashing outer jack 138 having a hole that fits around body 101 can be slid down body 101.

Once installed, mounting apparatus 100 can include additional components for mounting equipment, devices, and material. For example, a top cap 139 can be used to cover nut 131 and provide a platform for brackets to mount to mounting apparatus 100. A mounting bracket 141 sized and dimensioned to receive the first end of bolt 107 at a position above top cap 139 and mounting bracket 141 is secured using a washer 143 and a second nut 145.

Figure 4:
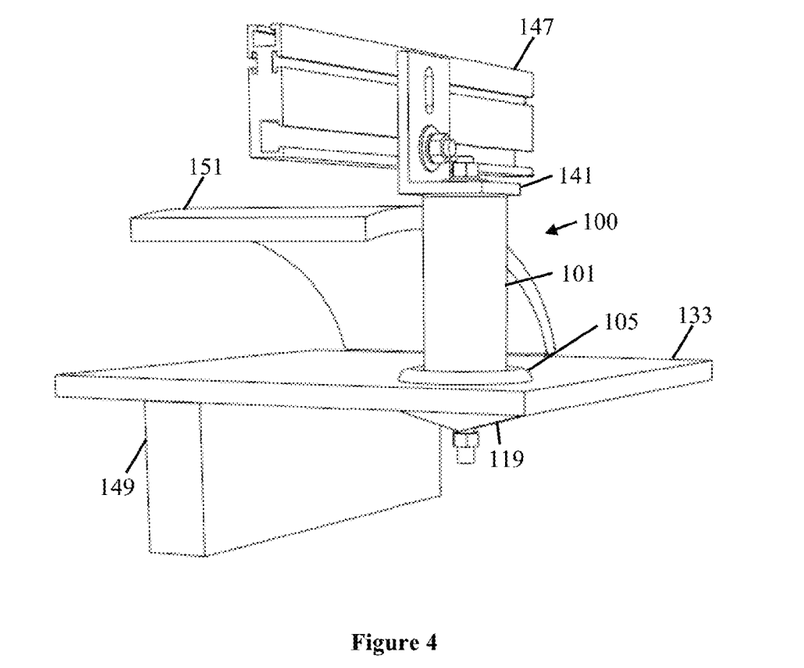
FIG. 4 is a perspective view of the mounting apparatus of FIG. 1 after installation having a mounting bracket and solar panel beam.

FIG. 4 shows mounting apparatus 100 in an installed configuration having a mounted solar panel beam 147. As discussed above, mounting apparatus 100 does not require that a truss/rafter 149 be used to mount equipment. In contrast, mounting apparatus 100 can be simply installed onto roof sheathing 133 as shown in FIG. 4. This reduces the number of roof tiles 151 removed for finding the centerline of truss/rafter 149. Solar beam 147 in FIG. 4 is a Unirac® 2.5 inch beam. However, it is contemplated that other mounting equipment, devices, and material can be used with mounting apparatus 100. For example, mounting apparatus 100 can be used to mount solar panels, awnings, cables, wall signs, satellite dishes, roof antennas, roof top unit curbs, safety lanyards, boating accessories, light fixtures, speakers, security cameras, riggings, tethering, seasonal decorations, canopies, raceways, plumbing lines and clean room equipment. In addition, mounting apparatus 100 can be used in class-1 and class-2 division-1 and division-2 hazardous areas and for seismic considerations.

Figure 5A:
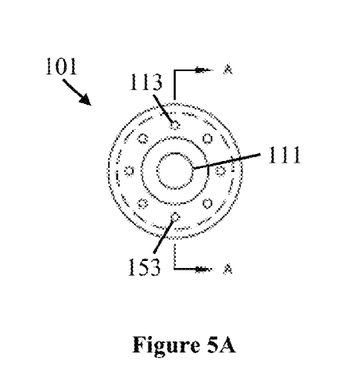
FIG. 5A is a bottom view of the body of the mounting apparatus of FIG. 1.
Figure 5B:
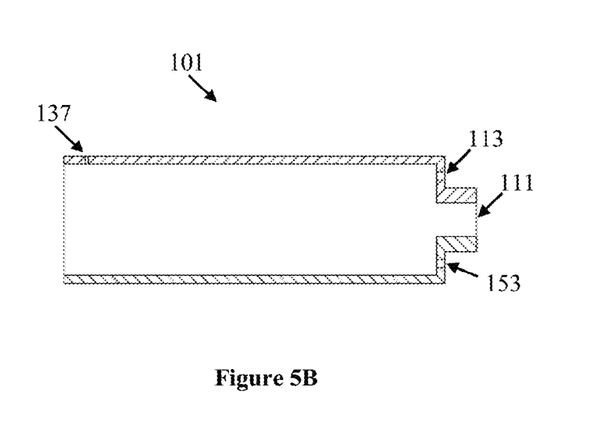
FIG. 5B is a cross sectional view of the body of FIG. 5A taken along the line A-A.

FIG. 5A shows a top view of body 101 used in the embodiments described above. Although body 101 is cylindrical, it is contemplated that various suitable shapes can be used, for example, a rectangle, triangle, square or some other shape. Body 101 has an opening 111 and a first aperture 113. It is contemplated that body 101 can also include a second aperture 153, such that movement of plunger 103 disposes sealant 105 through second aperture 153. In addition, body 101 can include more apertures as necessary to provide a sufficient seal and the position of the apertures can vary, but it is typically around the circumference of opening 111. FIG. 5B shows a cross-sectional view of body 101 at line A-A. Body 101 has a set hole 137 that extends to plunger 103. Furthermore, it is contemplated that body 101 is a standoff body.

Figure 6A:
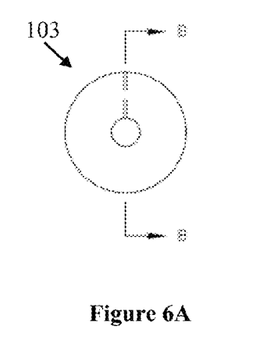
FIG. 6A is a bottom view of the plunger of the mounting apparatus of FIG. 1.
Figure 6B:
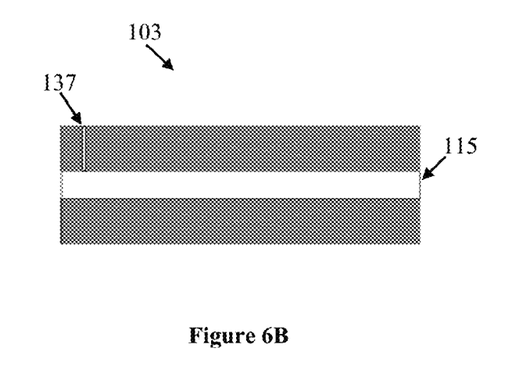
FIG. 6B is a cross sectional view of the plunger of FIG. 6A taken along the line B-B.

FIG. 6A shows a bottom view of plunger 103, which is composed of a solid cylinder that fits closely inside the diameter of body 101. Plunger 103 has a through hole 115 that extends through plunger 103 and has a close fit to bolt 107 as shown in FIG. 6B. Plunger 103 can be composed of various suitable materials including a metal, ceramic or a polymer having the material strength to receive the force provided by nut 131. In addition, it is contemplated that plunger 103 and body 101 can be composed of different or the same materials. It should be appreciated that through hole 115 of plunger 103 is typically aligned with opening 111 of body 101 to allow bolt 107 to extend through mounting apparatus 100.

Figure 7:
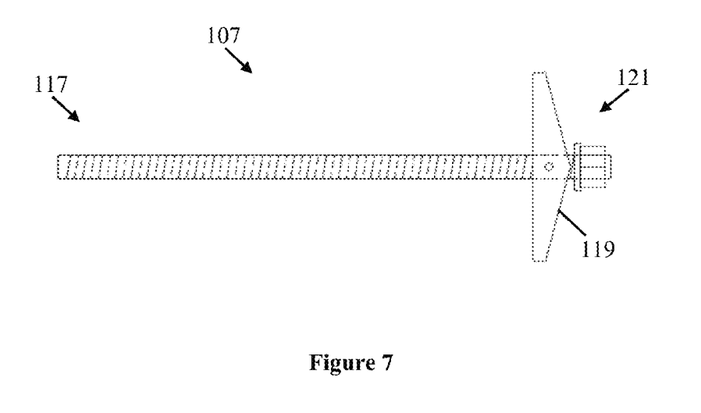
FIG. 7 is a side view of the bolt of the mounting apparatus of FIG. 1.

Bolt 107 has a first end 117 and a toggle 119 on a second end 121 as shown in FIG. 7. Toggle 119 can be restricted from expanding its wings using a toggle retainer during pre-installation. Bolt 107 can be a threaded bolt that engages with nut 131. Bolt 107 is typically positioned within body 101, such that toggle 119 on second end 121 extends through opening 111 on base 109 of body 101 and the first end 117 of bolt 107 extends through the opposite end of body 101.

Figure 8:
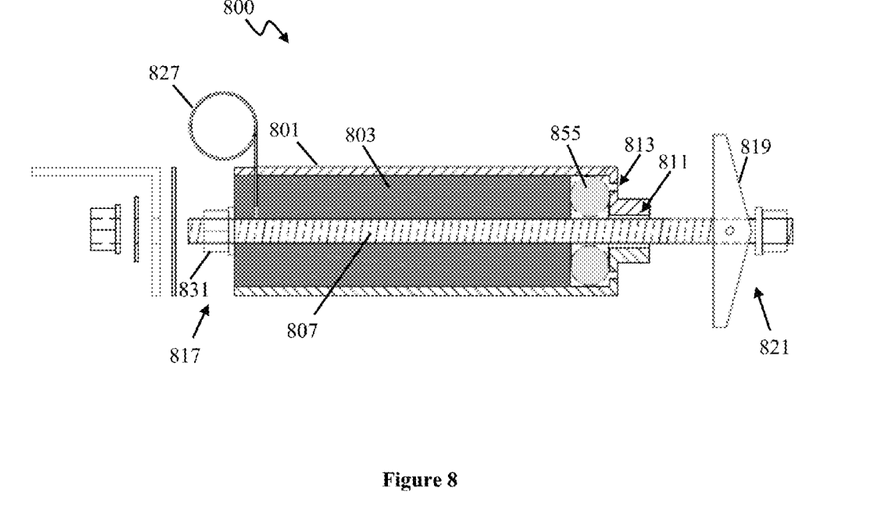
FIG. 8 is a cross sectional view of an example of a mounting apparatus having a sealant housed in a doughnut shaped breakable sealant bag.

In another embodiment, a mounting apparatus 800 has a sealant housed in a doughnut shaped breakable sealant bag 855 as shown in FIG. 8. It should be appreciates that using doughnut shaped breakable sealant bag 855 eliminates the optional elements of the airtight sticker and plastic disk described above. Doughnut shaped breakable sealant bag 855 houses the sealant within body 801 without exposing the sealant to air. Thus, doughnut shaped breakable sealant bag 855 prevents premature drying of the sealant in the body. While a circular doughnut shape bag is shown in FIG. 8, it is contemplated that other suitable shapes (e.g., torus with rectangle cross-section or triangle cross-section) can be used to house the sealant within body 801.

The operation of mounting apparatus 800 is similar to that described in the embodiment above. A set pin 827 is removed to allow movement of plunger 803 when nut 831 is tightened. When nut 831 is tightened, tension is provided to toggle 819 to secure mounting apparatus 800 onto a surface while plunger 803 simultaneously breaks doughnut shaped breakable sealant bag 855 to expose the housed sealant and disposes the sealant through at least one of the first aperture 813 and the opening 811. With respect to the other similarly numbered items as described above, the same characteristics apply.

Figure 9:
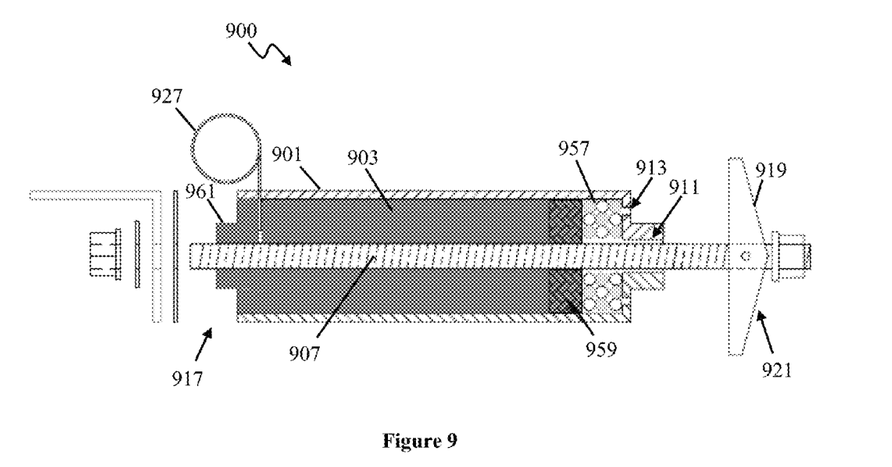
FIG. 9 is a cross sectional view of an example of a mounting apparatus having sealant beads.

In another embodiment, mounting apparatus 900 has sealant beads 957 disposed between plunger 903 and opening 911 of body 901 as shown in FIG. 9. Sealant beads 957 are typically used to house dissimilar sealants so they can be combined and mixed together during installation. For example, dissimilar sealants that can be used in sealant beads are two-part epoxy or exothermic welding agents. However, it is contemplated that the same sealant can be used in sealant beads 957.

Figure 10A:
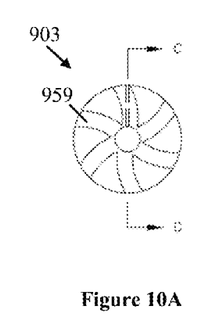
FIG. 10A is a bottom view of the plunger of the mounting apparatus of FIG. 9.
Figure 10B:
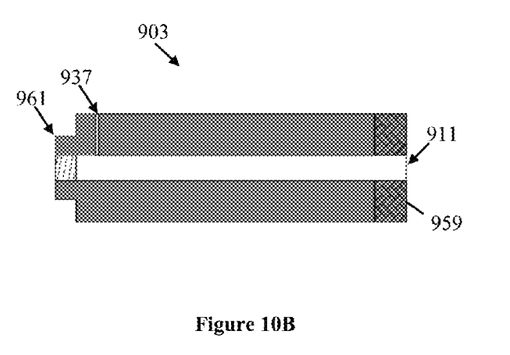
FIG. 10B is a cross sectional view of the plunger of FIG. 10A taken along the line C-C.

Mounting apparatus 900 has a plunger 903 that comprises teeth 959 to break sealant beads 957. However, it should be appreciated that teeth 959 are not required to break sealant beads 957 and that the plunger described in the embodiments above can be used with sealant beads. FIG. 10A shows a more detailed view of teeth 959 having serrated edges that are oriented towards the beads. FIG. 10B shows that plunger 903 includes a built in mixing nut 961 that turns plunger 903 as mixing nut 961 is tightened. When tightening mixing nut 961, tension is provided to toggle 919 to secure mounting apparatus 900 onto a surface while plunger 903 simultaneously breaks sealant beads 957 and mixes the sealant. Upon further tightening of mixing nut 961, the sealant is exposed through at least one of the first aperture 913 and the opening 911. With respect to the other similarly numbered items as described above, the same characteristics apply.

While plunger 903 comprises mixing nut 961 to turn plunger 903, it should be appreciated that mixing nut 961 can be separate from plunger 903 and that rotation of plunger 903 can be provided by other means. For example, it is contemplated that a nut has a frictional surface, such that the nut will cause plunger to spin when the frictional surface contacts the plunger.

Figure 11:
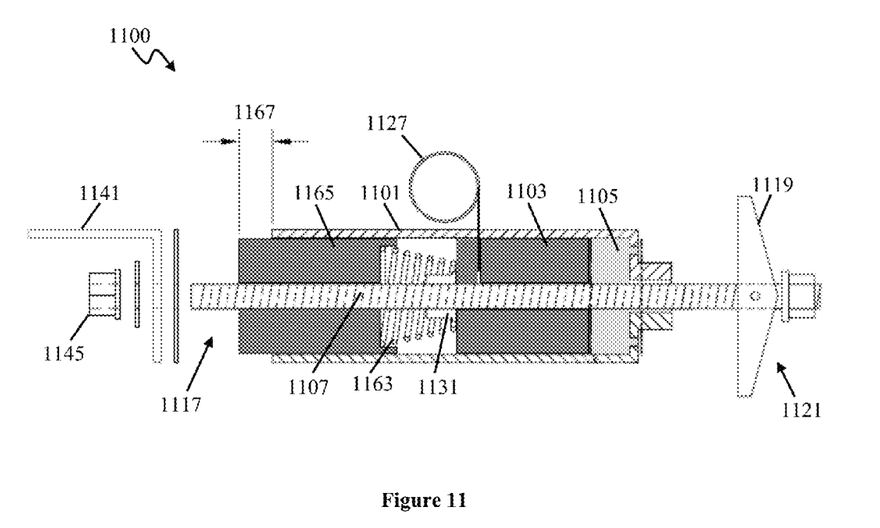
FIG. 11 is a cross sectional view of an example of a mounting apparatus having a spring and spring core.

In another embodiment, mounting apparatus 1100 has a spring 1163 and spring core 1165 as a shock absorber or dampener as shown in FIG. 11. Mounting apparatus 1100 works similar to the embodiments described above. Set pin 1127 is removed to allow plunger 1103 to move within body 1101. Nut 1131 is tightened to provide tension to toggle 1119 while simultaneously moving plunger 1103 to dispose sealant 1105.

Spring 1163 fits around nut 1131 and spring core 1165 sits above spring 1163. A second nut 1145 is tightened to compress spring 1163 to any desired travel length 1167. Thus, spring 1163 and spring core 1165 protects roof sheathing or some other surface from vertical shear where mounting apparatus 1100 is mounted. In addition, mounting apparatus 1100 also works as a shock absorber when exposed to extreme point loads generated by downward "gusting" forces. With respect to the other similarly numbered items as described above, the same characteristics apply.

It should be appreciated that the mounting apparatus described above can be modified in a number of ways. For example, the mounting apparatus can be modified to work when sealant is applied manually. In another example, the mounting apparatus can use liquid or gas in place of a compression spring as described above.

Other possible applications include redesigning the plunger with a polymeric actuator that uses dielectric elastomers. The dielectric elastomers would allow a device mounted to a single self sealing toggle mount to rotate with the sun. Also, the dielectric elastomers, if used in place of the compression spring, make it possible for the plunger to expand or telescope outward when electric current is applied from a photovoltaic source or otherwise.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A mounting apparatus, comprising:
    a body having a proximal end and a distal end, wherein the distal end comprising a shoulder, and a ridge extending distally from the shoulder;
    a bolt extending out the distal end of the body, and operatively connected with a toggle;
    a space situated between the bolt and the ride;
    a sealant disposed within the body; and
    a plunger disposed to push the sealant through the space.

2. The apparatus of claim 1, further comprising a set pin that engages a set hole extending through the body and the plunger to prevent movement of the plunger.

3. The apparatus of claim 1, further comprising a first aperture in the shoulder through which the sealant can travel.

4. The apparatus of claim 1, wherein the plunger comprises teeth.

5. The apparatus of claim 1, wherein the sealant comprises sealant beads.

6. The apparatus of claim 1, wherein the sealant is housed in a doughnut shaped breakable sealant bag the sealant from drying.

7. The apparatus of claim 3, further comprising an airtight sticker that covers the first aperture to prevent the sealant from drying.

8. The apparatus of claim 1, further comprising a plastic disk disposed within the body between the plunger and the sealant to prevent the sealant from drying.

9. The apparatus of claim 1, further comprising a nut sized and dimensioned to engage the proximal end of the bolt, wherein the nut and the toggle cooperate to provide movement of the plunger.

10. The apparatus of claim 9, further comprising a spring and spring core positioned above the nut to provide shock absorption.

11. The apparatus of claim 1, further comprising a top cap sized and dimensioned to receive the proximal end of the bolt to cover the plunger.

12. The apparatus of claim 1, further comprising a mounting bracket sized and dimensioned to receive the proximal end of the bolt.

13. The apparatus of claim 3, wherein the base comprises a second aperture and movement of the plunger disposes the sealant through the first and second apertures.

14. A self-sealing mounting apparatus for a surface, comprising:
    a body having a shoulder;
    a sealant disposed within the body;
    a ridge positioned between the shoulder and a toggle;
    a bolt that extends through the body, the shoulder, and the ridge, and is operatively coupled with the toggle;
    a plunger disposed to push the sealant through both an aperture in the shoulder and a passageway between the ridge and the bolt; and a nut that mates with the bolt, and is disposed to operate the plunger.

15. The self-sealing mounting apparatus of claim 14, further comprising a set pin that engages a set hole extending through the body and the plunger to prevent movement of the plunger.

16. The self-sealing mounting apparatus of claim 14, further comprising an airtight sticker that covers the aperture and a plastic disk disposed within the body between the plunger that prevent the sealant from drying.

17. The self-sealing mounting apparatus of claim 14, wherein the sealant is housed in a doughnut shaped breakable sealant bag to prevent the sealant from drying.

18. The self-sealing mounting apparatus of claim 14, wherein the sealant comprises sealant beads with dissimilar sealants.

19. The self-sealing mounting apparatus of claim 14, wherein the plunger comprises teeth sized and dimensioned to mix the sealant.

20. The self-sealing mounting apparatus of claim 14, further comprising a top cap sized and dimensioned to receive the bolt to cover the nut.

\* \* \* \* \*